March 15, 1927.
W. G. PANCOAST
AUTOMOBILE BUMPER
Filed May 22, 1926
1,621,081
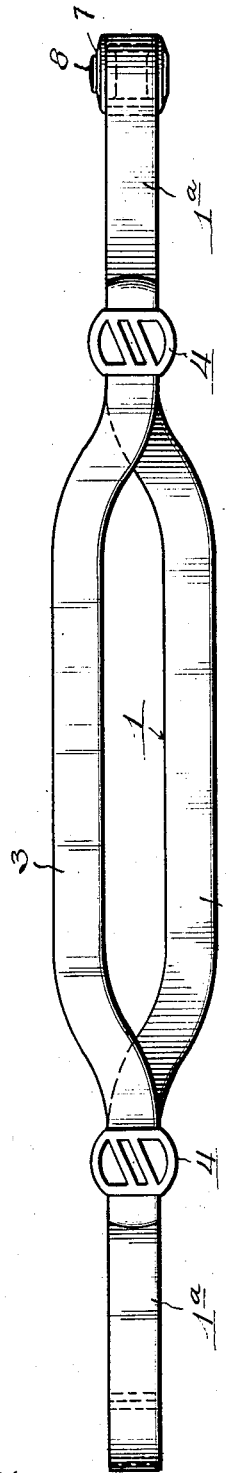
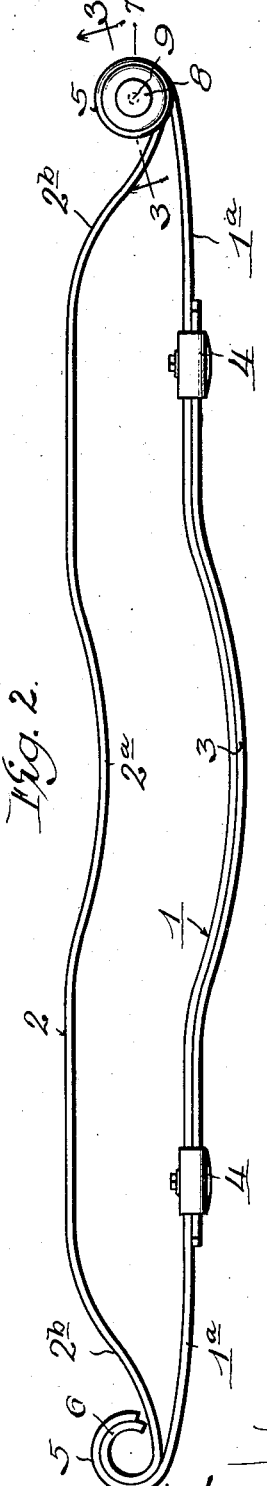
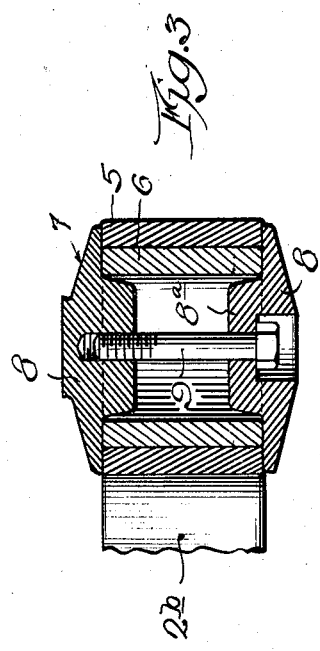
Inventor,
William G. Pancoast, Patented Mar. 15, 1927.

1,621,081

UNITED STATES PATENT OFFICE.

WILLIAM G. PANCOAST, OF WINNETKA, ILLINOIS, ASSIGNOR TO BIFLEX PRODUCTS COMPANY, OF WAUKEGAN, ILLINOIS, A CORPORATION OF DELAWARE.

AUTOMOBILE BUMPER.

Application filed May 22, 1926. Serial No. 110,907.

This invention relates to improvements in automobile bumpers, and more particularly to bumpers characterized by the use of resilient bars of spring steel in their construction.

The object of the present invention is to provide a structure having increased shock resisting capacity, attributable to a novel method of joining the ends of the transverse bars, whereby the same may swivel or pivot on each other, thus relieving in a considerable degree, the distortional effect of impact upon the bars.

A preferred embodiment of the invention is disclosed in the accompanying drawings, in which Figure 1 is a view in front elevation of the bumper.

Figure 2 is a top plan view of the bumper; and

Figure 3 is an enlarged detail view in vertical section taken on line 3—3 of Figure 1.

The bumper in its general aspects resembles a flattened loop adapted to be mounted at the front or rear of the vehicle, by means of suitable attaching members or fixtures. The essential parts of the bumper are flat resilient bars 1 and 2, of spring steel spaced apart in parallel relation substantially throughout the length of the bumper and bent toward each other at their ends.

The forward bar 1, forming the main portion of the impact section of the bumper, is slightly convex forwardly with a more pronounced rearward curvature throughout its end portions, $1^a$—$1^a$. The central portion $1^b$ of the forward bar is offset vertically and downwardly, and forms with an auxiliary bar 3, similarly offset but in an upward direction, a widened impact area, calculated to afford increased protection. This auxiliary bar 3 is rigidly clamped to the forward bar 1, by means of clamping members 4—4. In addition to the vertical offsetting of the forward and auxiliary bars, the same are preferably bowed in a forward direction throughout the central portion of the widened impact return, thus introducing increased stiffness, against distortion under impact, although this feature may be omitted, if desired.

The rear bar 2 is substantially straight intermediate its end portions, except for a centrally disposed bowed portion conforming to and located immediately behind the forwardly bowed portion of 3 of the front and auxiliary bars. The end portions $2^b$, $2^b$ of the rear bar are bent to incline forwardly and meet the ends $1^a$ of the front bar 1, in swivelled connections, now to be described.

It will be noted that the extreme ends of the front bar 1 are bent rearwardly and inwardly to form eyes 5—5 of fairly generous diameter. Moreover, these eyes are not fully closed there being a space or opening of say an inch or so at the rear and inner portions of each eye. Similarly the ends of the rear bar 2 have the form of eyes 6—6, the extremities of the bars being bent rearwardly and inwardly in the same manner as the eyes of the forward bar but are preferably closed. The eyes 6—6, moreover, are smaller in diameter and so dimensioned that their external diameter is substantially equal to the internal diameter of the eyes 5, 5. In this way, the pairs of eyes at each end of the rear bar may be fitted within the eyes of the front bar, and the surfaces capable of a limited turn movement upon each other, as about a pivot. This turning or swivelling movement would manifestly take place in the event of an impact received against the front bar, the effect of which would be to distort or bend the front bar rearwardly, with an attendant turning movement of its ends about the eyes of the rear bar, accompanied by a general flattening of the looped structure. This distortion proportionate to the force of the impact ceases when the pressure is released and the bars resume their normal position.

In shaping the bars, it is preferred that the rear bar shall be slightly shorter than the front bar, as measured from center to center of the eyes before assembly, thereby making it necessary to place the front bar under compression before the corresponding pairs of eyes are slipped into each other. The reason for this is to introduce an initial tension in the bumper structure, thereby making it stiffer and increasing its resistance to impacts.

The ends of the bumper as thus assembled, are finally secured against transverse displacement by the mounting of end fittings or clamps 7—7 at each end, although for clearness of illustration one of the fittings has been omitted. These fittings consist of a pair of circular metal caps 8—8 having bosses $8^a$ on one face thereof and a bolt 9, connecting the two together. One cap is placed on top with its boss extending into the eye 6 of the rear bars, and the other similarly positioned on the bottom. The bolt 9 is inserted through the center of the bottom cap and screwed into a threaded boss at the center of the upper cap. The former is preferably countersunk, as shown, so that the head of the bolt is concealed from view.

The advantage of the construction herein disclosed resides in the increased resistance offered to distortion under impact, by reason of the pivoting action at the ends of the bars, coupled with sufficient frictional resistance opposing the forces tending to distort the structure when an obstruction is encountered. In this manner the bumper is strengthened and its capacity to absorb shocks without permanent distortion of the bars is greatly increased.

Having set forth in full the features embodying my invention, I claim:

1. A bumper comprising resilient bars spaced apart transversely throughout the length thereof, and having their end portions bent in the form of eyes adapted to fit one within the other for pivotal movement, discs mounted above and below said end portions and having annular projections fitting in the ends of the innermost eyes, and a connecting member extending between said discs.

2. A bumper comprising resilient bars spaced apart transversely throughout the length thereof and having their end portions bent in the form of eyes adapted to fit one within the other for pivotal movement, discs mounted above and below said end portions and having annular projections fitting in the ends of the innermost eyes, and bolts passing through the eyes at each end of the bumper and connecting said discs together in clamping engagement with the eyes of said bars.

Signed at Chicago, Ill., this 19th day of May, 1926.

WM. G. PANCOAST.